US008001994B2

(12) United States Patent
Miller et al.

(10) Patent No.: US 8,001,994 B2
(45) Date of Patent: Aug. 23, 2011

(54) GAS CHANNELING DEVICE FOR DIRECTING BLASTS OF GAS THROUGH ALTERNATIVE OUTLET PASSAGEWAYS AND METHOD THEREFOR

(75) Inventors: Travis J. Miller, Sheffield, IL (US); Bradley E. Pronschinske, Kewanee, IL (US); Steven R. Spahn, Kewanee, IL (US)

(73) Assignee: Martin Engineering Company, Neponset, IL (US)

( * ) Notice: Subject to any disclaimer, the term of this patent is extended or adjusted under 35 U.S.C. 154(b) by 794 days.

(21) Appl. No.: 12/102,469

(22) Filed: Apr. 14, 2008

(65) Prior Publication Data

US 2009/0255559 A1 Oct. 15, 2009

(51) Int. Cl.
*F16K 11/02* (2006.01)

(52) U.S. Cl. ......................... 137/874; 222/195; 406/182

(58) Field of Classification Search .................. 137/874; 124/73; 451/91, 101; 222/195; 406/182
See application file for complete search history.

(56) References Cited

U.S. PATENT DOCUMENTS

| | | | | | |
|---|---|---|---|---|---|
| 3,270,775 | A | | 9/1966 | Alderson | |
| 3,674,123 | A | * | 7/1972 | Lewis et al. | 193/23 |
| 4,138,161 | A | * | 2/1979 | Payne | 406/155 |
| 4,165,134 | A | * | 8/1979 | Payne | 406/1 |
| 4,165,820 | A | * | 8/1979 | Dugge et al. | 222/644 |
| 4,291,724 | A | * | 9/1981 | Miller | 137/555 |
| 4,372,337 | A | * | 2/1983 | Holzenberger | 137/240 |
| 4,496,076 | A | * | 1/1985 | Tompkins | 222/3 |
| 4,718,457 | A | | 1/1988 | Luger | |
| 4,938,848 | A | * | 7/1990 | Raines et al. | 205/392 |
| 5,226,759 | A | * | 7/1993 | Hilmer et al. | 406/182 |
| 5,329,970 | A | | 7/1994 | Squirrell | |
| 5,441,171 | A | * | 8/1995 | Maury | 222/3 |
| 5,549,138 | A | * | 8/1996 | Eminger | 137/876 |
| 6,311,681 | B1 | * | 11/2001 | Snyder, Jr. | 124/59 |
| 6,644,294 | B2 | | 11/2003 | Christensen | |
| 7,222,640 | B2 | * | 5/2007 | Gadd | 137/625.46 |
| 2006/0070722 | A1 | | 4/2006 | Shelton et al. | |
| 2007/0209648 | A1 | | 9/2007 | Pronschinske et al. | |

OTHER PUBLICATIONS

International Search Report for PCT/US2009/040093 dated Jun. 3, 2009.

* cited by examiner

*Primary Examiner* — John Fox
(74) *Attorney, Agent, or Firm* — Thompson Coburn LLP; Clyde L. Smith

(57) ABSTRACT

A gas channeling device for selectively channeling blasts of gas from an air cannon to various locations comprises a stationary portion and a movable portion. The stationary portion comprises a fluid inlet passageway and at least first and second fluid outlet passageways. The movable portion comprises a fluid channeling passageway, and is pivotally movable about a pivot axis relative to the stationary portion in a manner such that the movable portion can be selectively positioned in alternative first and second positions relative to the stationary portion. The fluid channeling passageway operatively connects the fluid inlet passageway to the first fluid outlet passageway when the movable portion is in the first position. The fluid channeling passageway operatively connects the fluid inlet passageway to the second fluid outlet passageway when the movable portion is in the second position.

13 Claims, 8 Drawing Sheets

GAS CHANNELING DEVICE FOR DIRECTING BLASTS OF GAS THROUGH ALTERNATIVE OUTLET PASSAGEWAYS AND METHOD THEREFOR

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention relates generally to air cannons of the type used for removing material deposits from the walls of industrial vessels and other bulk material handling devices, such as kilns used in the cement and paper industries. More particularly, the present invention pertains to a gas channeling device that is capable of selectively directing blasts of gas from an air cannon to alternate bulk material handling devices or alternate locations of a bulk material handling device.

2. Related Art

Air cannons are commonly used for removing the buildup of deposits on the walls of bulk material handling devices, such as kilns. An air cannon generally consists a compressed gas storage container and a release valve. A compressor may be attached to the compressed gas storage container for adding compressed gas to the storage container. The released gas is channeled to bulk material handling device. Although referred to as air cannons, the compressed gas is not necessarily always air and may be other gases such as nitrogen or carbon-dioxide.

To reduce the number of air cannons required in a given industrial center, various gas channeling devices have been developed for selectively directing the blasts of gas discharged from an air cannon to alternative locations or bulk material handling devices. One such gas channeling device is disclosed in U.S. Patent Publication Number 2006/0070722 (U.S. patent application Ser. No. 10/956,741), entitled Air Cannon Manifold, which is hereby incorporated into this application by reference and in its entirety. A disadvantage of such devices is that they utilize multiple valves or moving parts, which reduce reliability and increase the costs of such devices. Another disadvantage of such devices is that they disrupt the flow of gas blasts passing therethrough and therefore diminish the effectiveness of the gas blasts. The gas channeling device of the present invention overcome these disadvantages.

SUMMARY OF THE INVENTION

In a first aspect of the invention, a gas blaster assembly comprises a storage container having a volume of compressed gas, a gas channeling device, and a release valve. The gas channeling device comprises a stationary portion and a movable portion. The stationary portion comprises a fluid inlet passageway and at least first and second fluid outlet passageways. The movable portion comprises a fluid channeling passageway, and is pivotally movable about a pivot axis relative to the stationary portion in a manner such that the movable portion can be selectively positioned in alternative first and second positions relative to the stationary portion. The fluid channeling passageway operatively connects the fluid inlet passageway to the first fluid outlet passageway when the movable portion is in the first position. The second fluid outlet passageway is operatively disconnected from the fluid inlet passageway when the movable portion is in the first position. The fluid channeling passageway operatively connects the fluid inlet passageway to the second fluid outlet passageway when the movable portion is in the second position. The first fluid outlet passageway is operatively disconnected from the fluid inlet passageway when the movable portion is in the second position. The release valve operatively connects the volume of compressed gas to the fluid inlet passageway of the gas channeling device.

In a second aspect of the invention, a gas channeling device comprises a stationary portion and a movable portion. The stationary portion comprises a fluid inlet conduit and a plate member. The fluid inlet conduit defines a fluid inlet passageway. The plate member comprises a plurality of openings that extend through the plate member and define a plurality of fluid outlet passageways. The plate member has a planar sealing surface that defines an inlet terminal end of each of the fluid outlet passageways. The inlet terminal ends of the fluid outlet passageways are circumferentially spaced about a pivot axis that extends perpendicular to the sealing surface of the plate member. The movable portion comprises a planar sealing surface, at least one o-ring seal, and a fluid channeling passageway having opposite inlet and outlet terminal ends. The sealing surface defines the outlet terminal end of the fluid channeling passageway. The movable portion is pivotally mounted to the plate member in a manner such that the movable portion can be selectively pivoted about the pivot axis in alternative first and second positions relative to the stationary portion. The o-ring seal is sandwiched by and between the sealing surface of the movable portion and the sealing surface of the plate member and encircles the outlet terminal end of the fluid channeling passageway. The fluid channeling passageway operatively connects the fluid inlet passageway to a first one of the fluid outlet passageways when the movable portion is in the first position. A second one of the fluid outlet passageways is operatively disconnected from the fluid inlet passageway when the movable portion is in the first position. The fluid channeling passageway operatively connects the fluid inlet passageway to the second one of the fluid outlet passageways when the movable portion is in the second position. The first one of the fluid outlet passageways is operatively disconnected from the fluid inlet passageway when the movable portion is in the second position.

Yet another aspect of the invention pertains to a method of utilizing a gas channeling device. The gas channeling device comprises a stationary portion and a movable portion. The stationary portion comprises a fluid inlet passageway and a plurality of fluid outlet passageways. The movable portion comprises a fluid channeling passageway. The movable portion is pivotally movable about a pivot axis relative to the stationary portion in a manner such that the movable portion can be selectively positioned in alternative first and second positions relative to the stationary portion. The method comprises a step of activating a release valve in a manner discharging compressed gas from a storage container and forcing a blast of gas through the fluid inlet passageway, the fluid channeling passageway, and a first one of the fluid outlet passageways of the gas channeling device while the movable portion of the gas channeling device is in the first position.

The method comprises another step of causing the movable portion of the gas channeling device to pivot about the pivot axis relative to the stationary portion from the first position and into the second position. Still further, the method comprises a step of activating the release valve in a manner discharging compressed gas from the storage container and forcing a blast of gas through the fluid inlet passageway, the fluid channeling passageway, and a second one of the fluid outlet passageways of the gas channeling device while the movable portion of the gas channeling device is in the second position.

Further features and advantages of the present invention, as well as the operation of the preferred embodiment of the present invention, are described in detail below with reference to the accompanying drawings.

Figure 1:
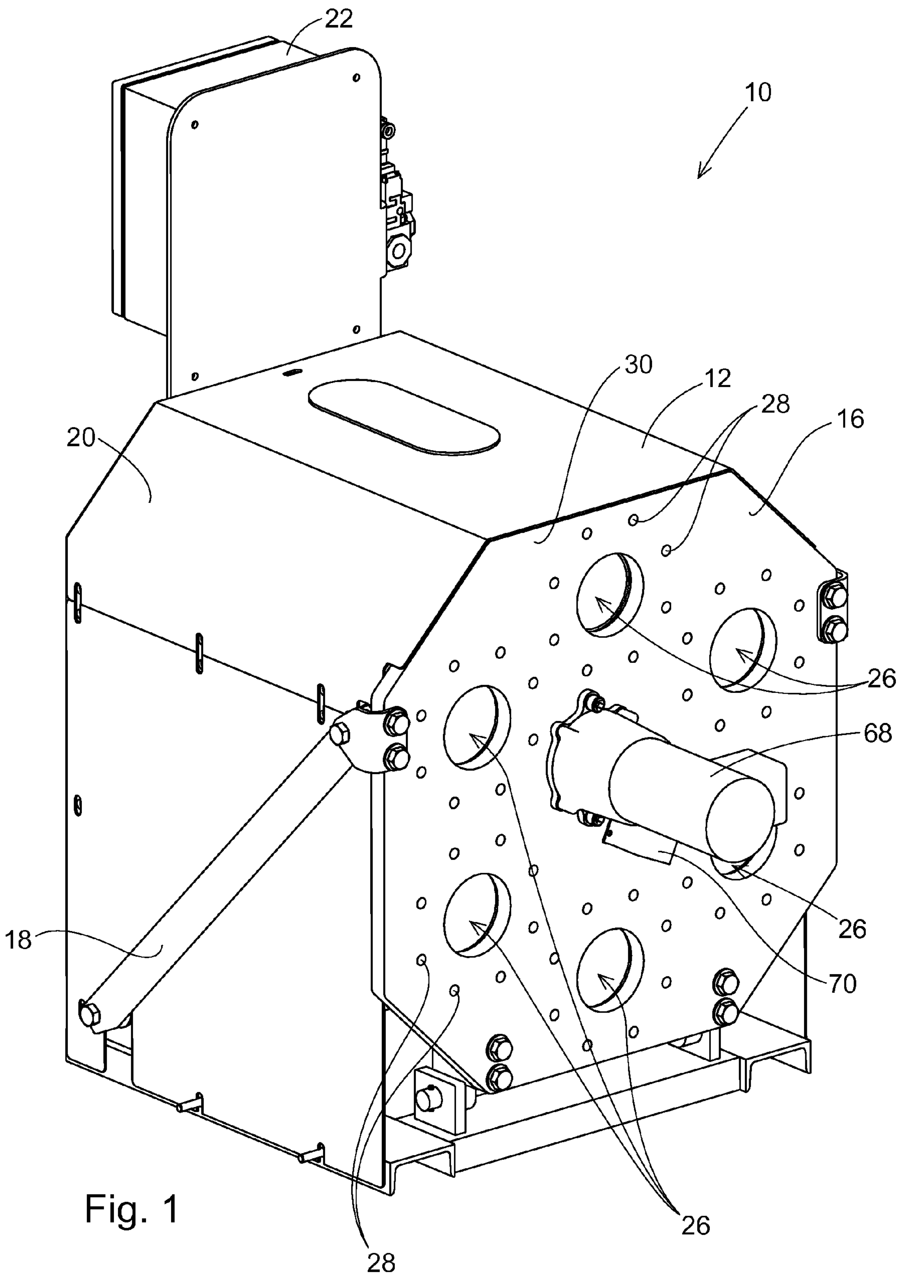
FIG. 1 illustrates a perspective view of the preferred embodiment of a gas channeling device in accordance with the invention, showing the front, top, a left sides thereof.

Reference numerals in the written specification and in the drawing figure indicate corresponding items.

DETAILED DESCRIPTION OF THE PREFERRED EMBODIMENT

Figure 2:
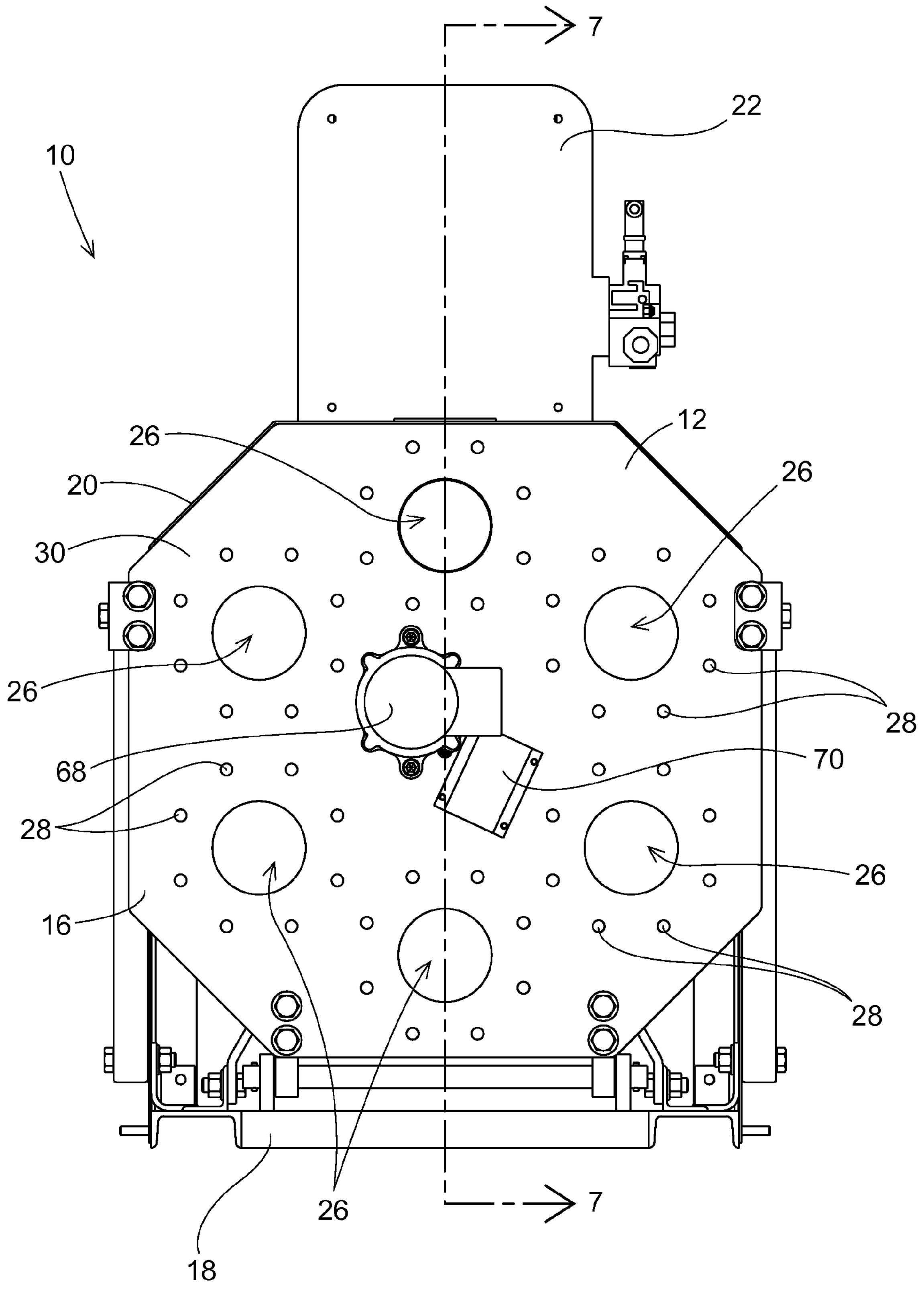
FIG. 2 illustrates a front elevation view of the gas channeling device shown in FIG. 1.
Figure 3:
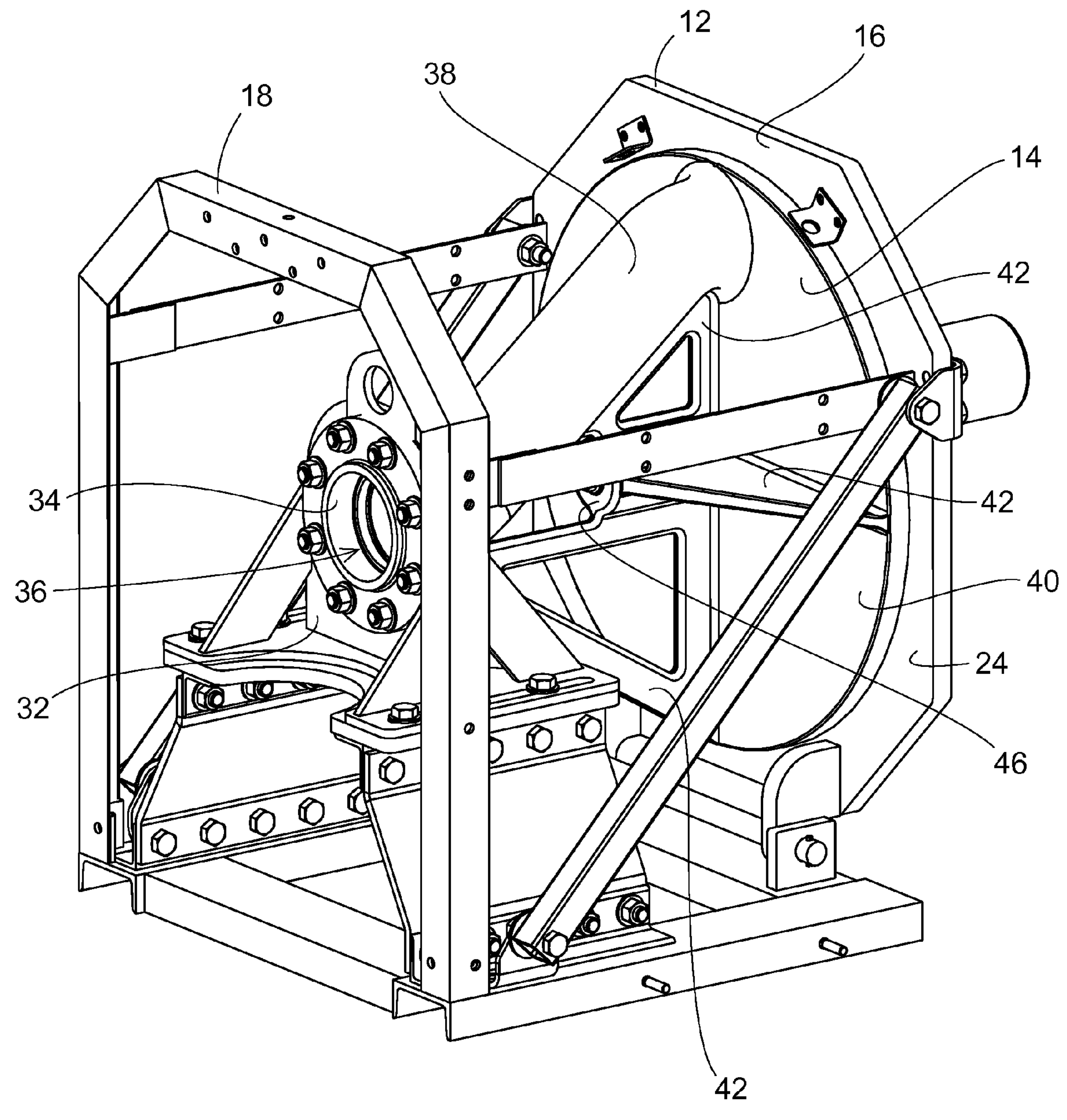
FIG. 3 illustrates a perspective view of the gas channeling device shown in FIGS. 1 and 2 and is shown with its housing removed.

A preferred embodiment of a gas channeling device 10 in accordance with the invention is shown in its entirety in FIGS. 1 and 2. The gas channeling device 10 primarily comprises a stationary portion 12 and a movable portion 14 (shown in FIGS. 3-7).

The stationary portion 12 of the gas channeling device preferably comprises a plate member 16, support structure 18, a housing 20, and an electrical power feed panel 22. The housing 20 is supported by the support structure 18 and the plate member 16 and serves the primary purpose of shielding the movable portion 14 of the gas channeling device 10 so as to prevent injuries. The power feed panel 22 acts as a junction box for a control circuit (not shown) used to control the operation of the gas channeling device 10. The support structure 18 supports the plate member 16, the movable portion 14 of the gas channeling device 10, the power feed panel 22, and the housing 20. The plate member 16 is preferably formed of steel and is relatively thick so as to be substantially rigid. The plate member 16 preferably has a planar surface 24 that faces the movable portion 14 of the gas channeling device 10 and comprises a plurality of openings 26 that extend through the plate member. The openings 26 are preferably circular and preferably extend through the plate member 16 perpendicular to the planar surface 24. There are preferably six openings 26 that are evenly spaced about the circumference of a circle. A plurality of mounting holes 28 extend in a the outer face 30 of the plate member 16 and surround each of the openings 26. The stationary portion 12 of the gas channeling device 10 also preferably comprises a mounting flange 32 that supports an inlet attachment socket 34. An opening through the mounting flange 32 creates a fluid inlet passageway 36.

Figure 6:
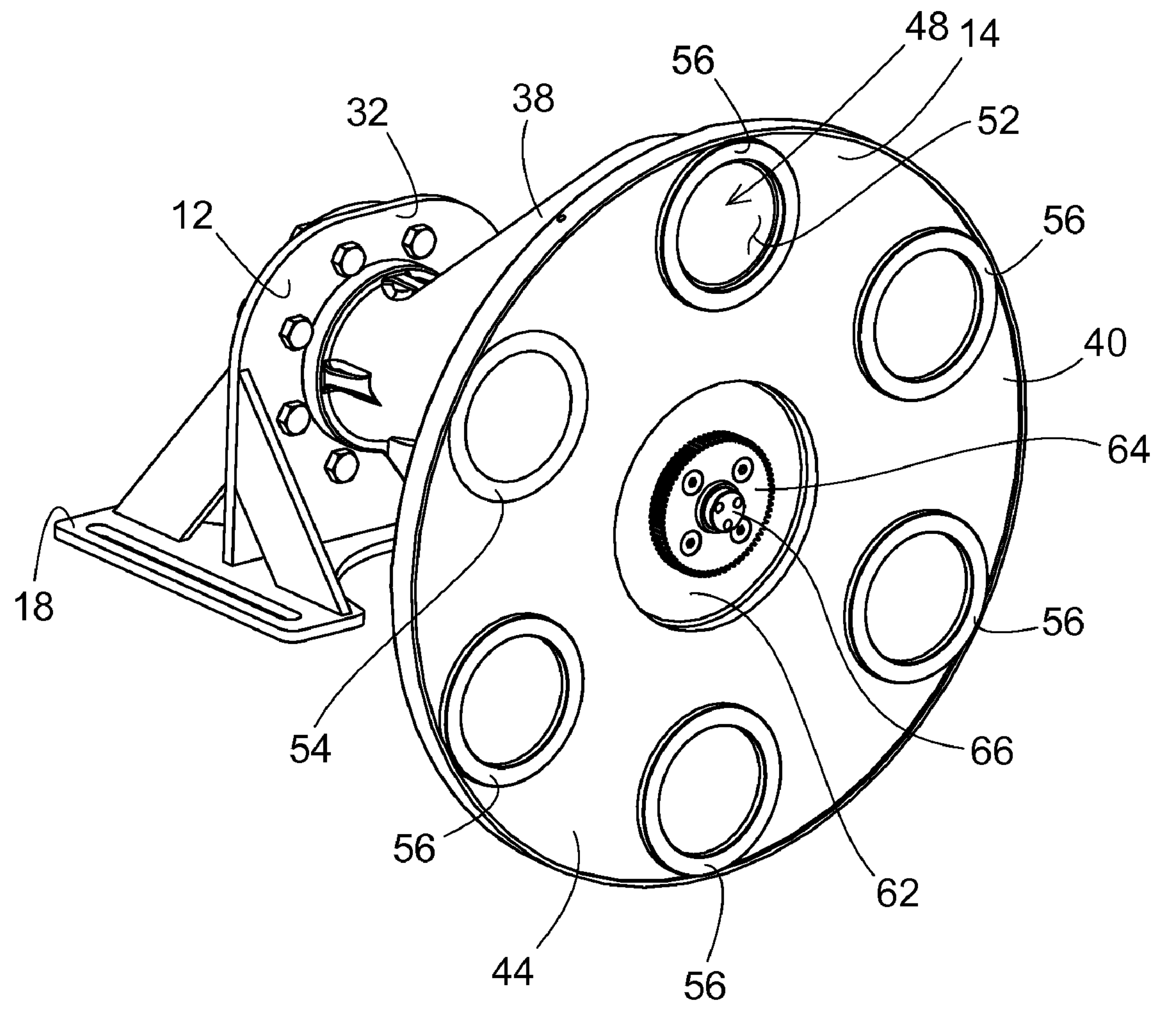
FIG. 6 illustrates a perspective view of the movable portion of the gas channeling device shown in FIGS. 1-5, and is shown with most of the stationary portion of the device, including the plate member, removed.
Figure 7:
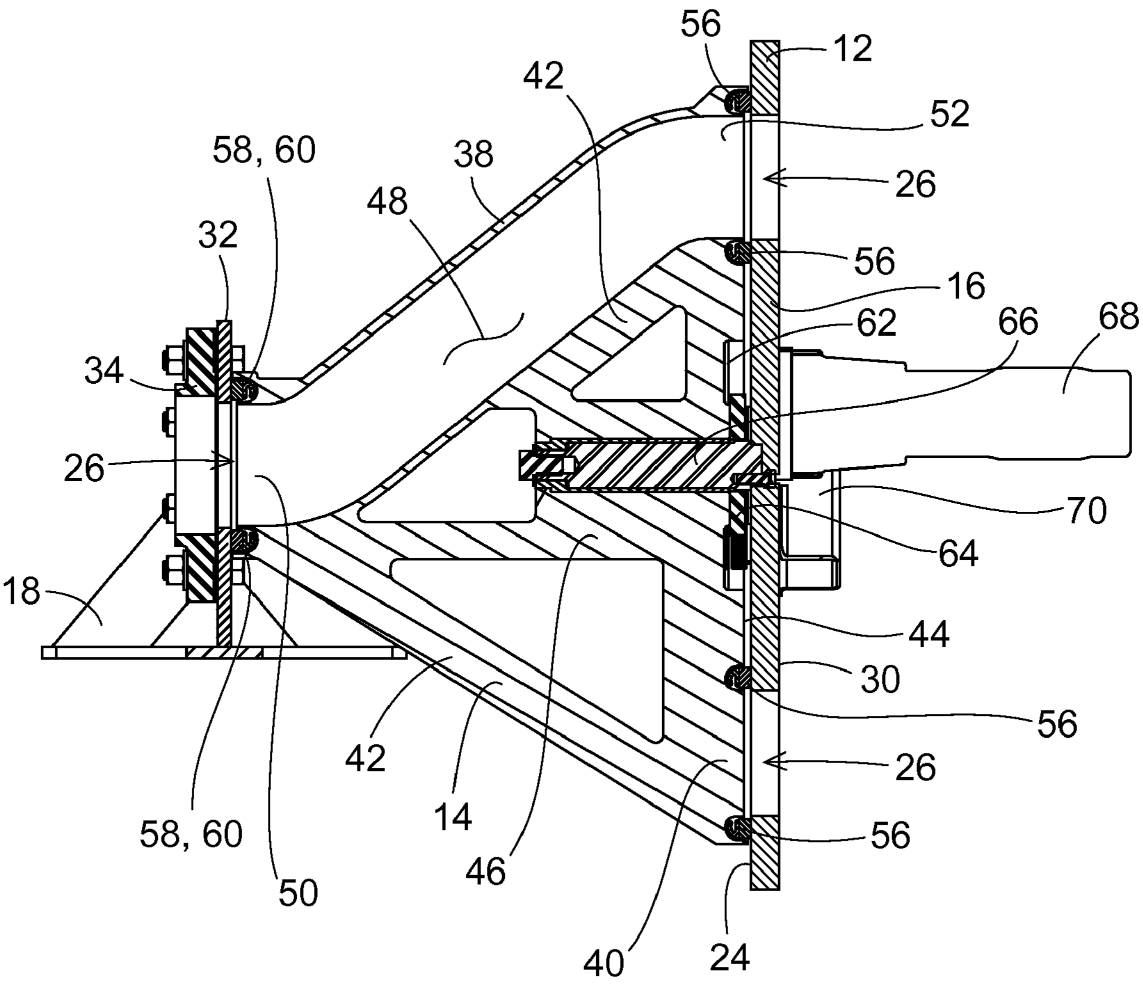
FIG. 7 is a cross-sectional view of the movable portion of the gas channeling device shown in FIGS. 1-6 (taken about the line 7-7 shown in FIG. 2), along with part of the stationary portion of the device, and is shown with the movable portion oriented in the first position.

The movable portion 14 of the gas channeling device 10 comprises a fluid channeling conduit 38 and a discoidal member 40. The fluid channeling conduit 38 is preferably rigidly attached to the discoidal member 40 via a plurality of ribs 42. The discoidal member 40 comprises a planar surface 44 and defines a pivot axis that extends perpendicular to the planar surface and through the center of the discoidal member. A cylindrical protrusion 46 extends from the back side of the discoidal member 40 and has a bore that extends thereinto from the planar surface 44 in a manner forming a gudgeon aligned with the pivot axis. The fluid channeling conduit 38 defines a fluid channeling passageway 48 having an inlet terminal end 50 and an outlet terminal end 52. The outlet terminal end 52 is preferably also defined by the planar surface 44. The inlet terminal end 50 of the fluid channeling passageway 48 is preferably circular and is preferably aligned with the pivot axis. The fluid channeling passageway 48 diverges away from the pivot axis to one side thereof as it extends from its inlet terminal end 50 to its outlet terminal end 52. The inlet terminal end 50 and the outlet terminal end 52 of the fluid channeling passageway 48 are preferably parallel to the planar surface 44 of the movable portion 14 of the gas channeling device 10. A plurality of annular grooves 54 extend into the discoidal member 40 from the planar surface 44 and are positioned circumferentially about the pivot axis in a pattern matching that of the openings 26 that extend through the plate member 16 of the stationary portion 12 of the gas channeling device 10. An annular o-ring seal 56 is inserted into and protrudes from each of the annular grooves 54. FIG. 6 shows the movable portion 14 with one of the o-ring seals 56 removed to expose one of the annular grooves 54. One of o-ring seals 56 encircles the outlet terminal end 52 of the fluid channeling passageway 48. Another annular groove 58 is formed into the fluid channeling conduit 38 and encircles the inlet terminal end 50 of the fluid channeling passageway 48. Similarly, another annular o-ring seal 60 extends into said annular groove 58 and protrudes outward therefrom. A cylindrical recess 62 is formed into the discoidal member 40 from the planar surface 44 and is aligned with the pivot axis. A toothed gear 64 is aligned with the pivot axis and is position in the cylindrical recess 62. The toothed gear 64 is rigidly fixed to the discoidal member 40 for rotation therewith. Still further, a pintle 66 extends into the gudgeon through a center opening of the toothed gear 64 and is axially secured to the movable portion, preferably by a bolt at the end of the cylindrical protrusion. It should be appreciated that the pintle 66 remains able to pivot within the gudgeon about the pivot axis relative to the discoidal member 40 and fluid channeling conduit 38.

The movable portion 14 of the gas channeling device 10 is pivotally attached to the stationary portion 12 via the pintle 66. More particularly, the pintle 66 is rigidly mounted (preferably via bolts) to the plate member 16 of the stationary portion 12 in a manner such that it protrudes outwardly from the planar surface 24 of the stationary portion 12. Preferably, the distance between mounting flange 32 of the stationary portion 12 and the planar surface 24 of the plate member 16 is such that the movable portion 14 fits therebetween, but with the o-ring seals 56 on the discoidal member 40 being compressed against and between the discoidal member and the planar surface 24 of the plate member 16, and with the o-ring seal 60 at the inlet terminal end 50 of the fluid channeling passageway 48 compressed against and between the mounting flange 32 and the fluid channeling conduit 38. The even circumferential spacing of the o-ring seals 56 positioned between the discoidal member 40 and the planar surface 24 of the plate member 16 ensures that no bending stresses are induce in the pintle 66 as a result of the compression of the seals.

The gas channeling device 10 also preferably comprises an electric drive motor 68 and an indexing sensor 70, each of which are preferably mounted to and protrude from the outer face 30 of the plate member 16. The drive motor 68 comprises a rotor (not shown) that has a shaft that extends through the plate member 16 and attaches to a toothed gear (not shown) that is engaged with the toothed gear 64 of the movable portion 14 of the gas channeling device 10. Similarly, the indexing sensor 70 comprises a shaft that extends through the plate member 16 and attaches to a toothed gear (not shown) that is engaged with the toothed gear 64 of the movable portion 14 of the gas channeling device 10. The drive motor 68 and the indexing sensor 70 are each operatively connected to the control circuit of the power feed panel 22. The drive motor 68 is configured to pivot the movable portion 14 of the gas channeling device 10 about the pivot axis relative to the stationary portion 12 by applying torque to the toothed gear 64 of the movable portion. The toothed gear 64 of the movable portion 14 drives the indexing sensor 70, which senses the amount of rotation made by the movable portion. The control circuit in the power feed panel 22 uses the signal from the indexing sensor 70 to control the drive motor 68 to thereby rotate the movable portion 14 in a manner such that the outlet terminal end 52 of the fluid channeling passageway 48 can be alternatively aligned with any of the openings 26 of the plate member 16.

Figure 8:
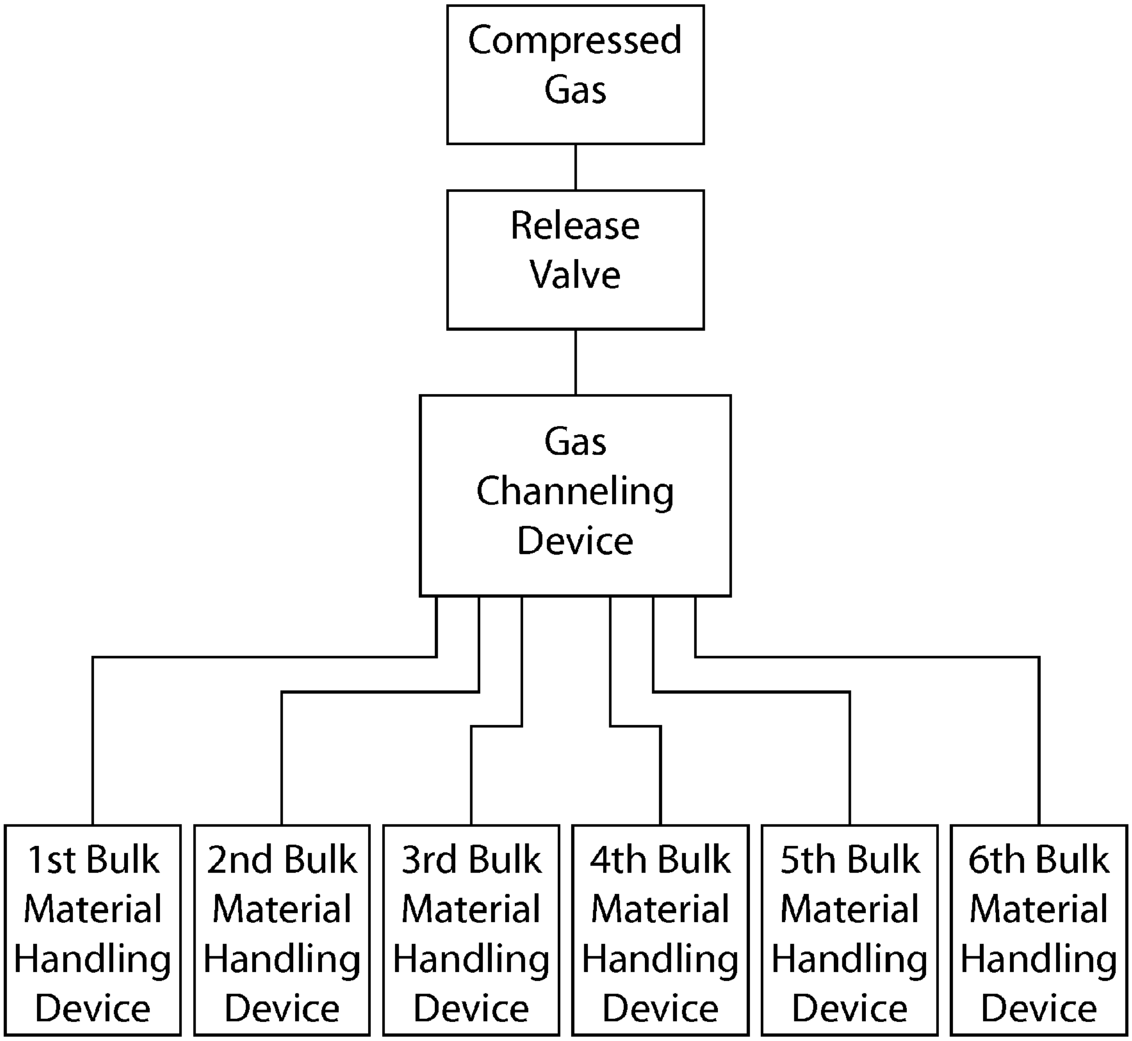
FIG. 8 is a schematic of an assembly in accordance with the invention that comprises stored compressed gas, a release valve, a gas channeling device, and a plurality of bulk material handling devices.

In view of the foregoing, it should be appreciated that the openings 26 of the plate member 16 constitute a plurality of alternative fluid outlet passageways of the gas channeling device 10, with the planar surface 24 of the plate member defining the inlet terminal ends of such fluid outlet passageways. Thus, up to six bulk material handling devices (shown schematically in FIG. 8) can be attached to the gas channeling device 10 via the mounting holes 28 surround the openings 26 of the plate member 16. Of course, not all of the openings 26 need to be operatively connected to a bulk material handling device. The fluid inlet passageway 36 is configured to be operatively connected to a source of compressed gas (shown schematically in FIG. 8) via the inlet attachment socket 34, with a release valve (shown schematically in FIG. 8) operatively connected therebetween.

Figure 4:
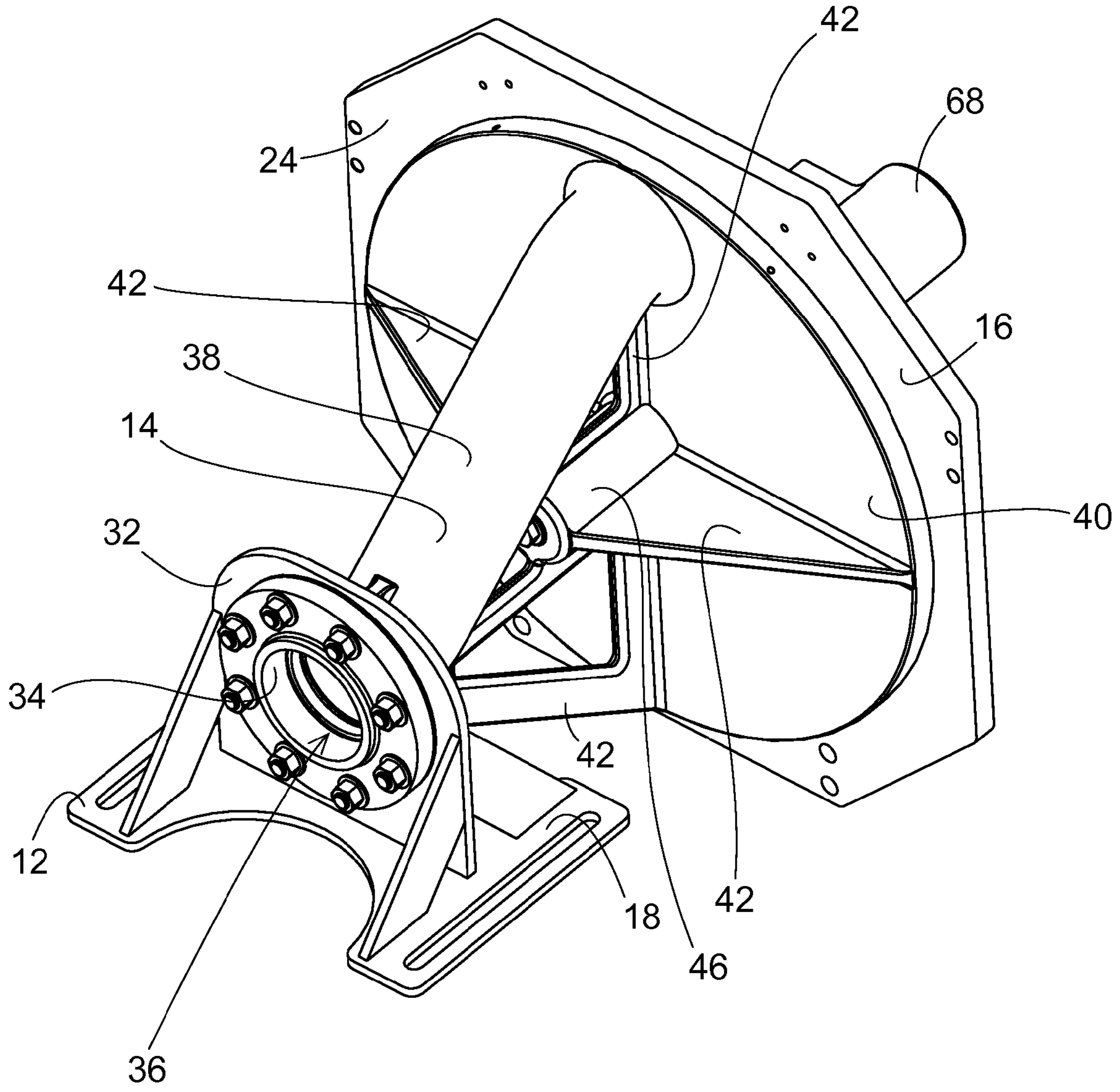
FIG. 4 illustrates another perspective view of the gas channeling device shown in FIGS. 1-3 and is shown with much of the support structure removed and with the movable portion of the device oriented in a first position relative to the stationary portion of the device.

In operation, the moveable portion 14 of the gas channeling device 10 can be positioned in a first rotational orientation with respect to the stationary portion 12, such as is shown in FIG. 4. In this position, the outlet terminal end 52 of the fluid channeling passageway 48 is aligned with the upper most one of the fluid outlet passageways formed by the openings 26 of the plate member 16. Also in this position, each of the fluid outlet passageways, including the uppermost one, is aligned with one of the o-ring seals 56 that are positioned between the plate member 16 and the movable portion 14. The o-ring seal 56 that is aligned with the uppermost fluid outlet passageway creates a leak resistant path between the fluid channeling conduit 38 and the uppermost fluid outlet passageway. The remainder of the o-ring seals 56 between the plate member 16 and movable portion 14 seal off the terminal ends of the other fluid outlet passageways, thereby preventing dust and debris from entering said fluid outlet passageways.

Figure 5:
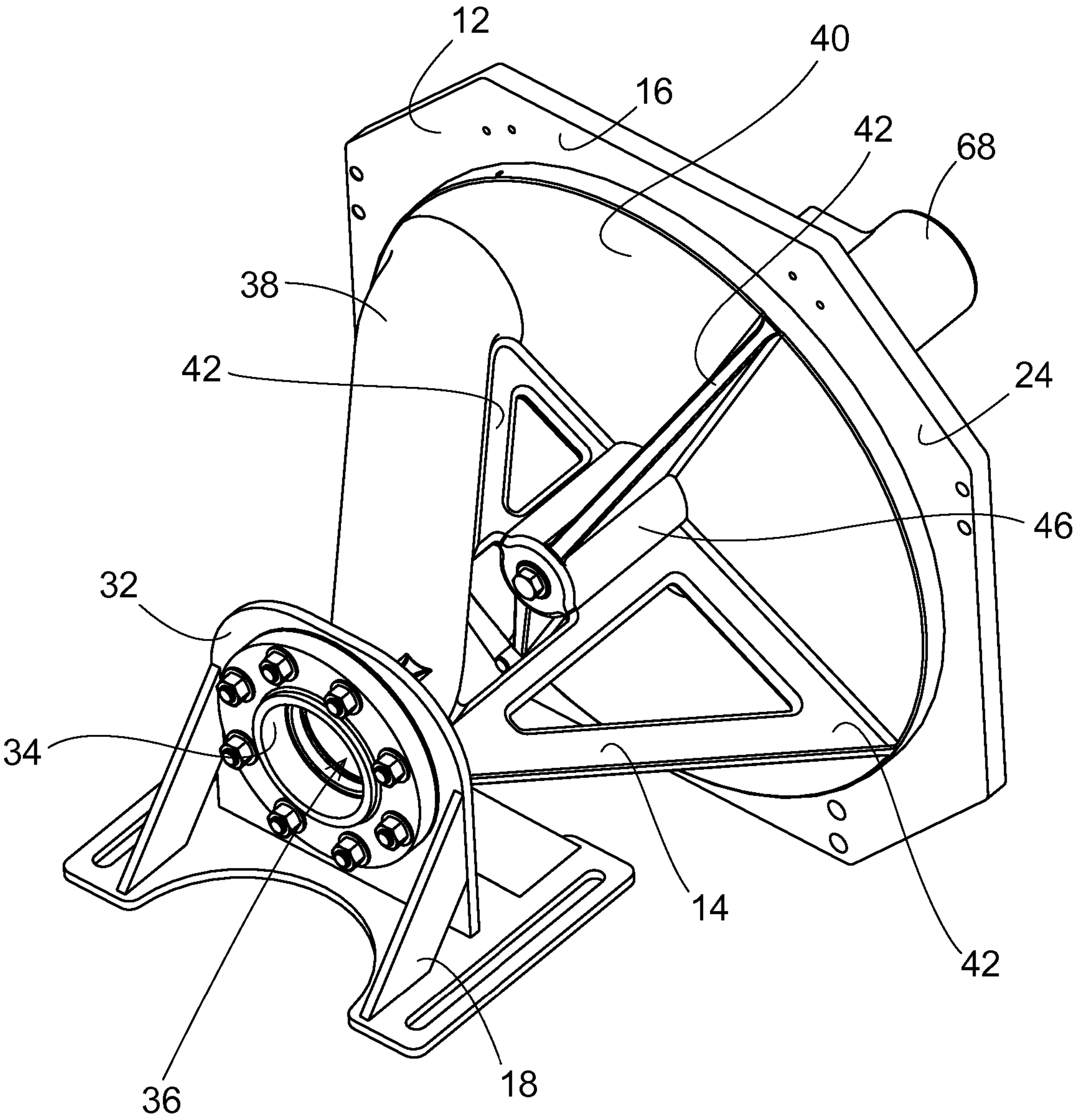
FIG. 5 illustrates a perspective view similar to that of FIG. 4, but with the movable portion of the device oriented in a second position relative to the stationary portion of the device.

When the release valve is activated, the source of compressed gas forces a blast of gas to pass through the fluid inlet passageway 36, the fluid channeling passageway 48, and through the uppermost fluid outlet passageway. This in turn sends a blast of compressed gas to the bulk material handling device that is operatively connected to the uppermost fluid outlet passageway. The gas channeling device 10 can be configured to such that, following the discharge of gas through the uppermost fluid outlet passageway, the drive motor 68 activates and pivots the movable portion 14 of the gas channeling device 10 to align the outlet terminal end 52 of the fluid channeling passageway 48 with another one of the openings 26 (i.e., a different fluid outlet passageway, as is shown in FIG. 5 for example) of the plate member 16. In this second position, subsequent activation of the release valve will cause the source of compressed gas to force a blast of gas to pass through the fluid inlet passageway 36, the fluid channeling passageway 48, and through this other fluid outlet passageway, and cause a blast of gas to be discharge in the a bulk material handling device that is operatively connected to this other fluid outlet passageway. Thus, it should be appreciated that the movable portion 14 of the gas channeling device 10 can be pivoted in a manner directing blasts of gas to any of the plurality of fluid outlet passageways, and any bulk transfer devices attached thereto.

It should also be appreciated that, using the present invention, a single release valve can selectively cause the delivery of blasts of gas to any of multiple bulk material handling devices. Still further, it should be appreciated that the fluid channeling passageway, the fluid inlet passageway, and each fluid outlet passageway have generally uniform cross-sections such that the gas channeling device does not appreciably diminish the pressure waves of gas blasts passing therethrough. In view of the foregoing, it should be appreciated that the invention achieves several advantages over prior art methods.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

It should also be understood that when introducing elements of the present invention in the claims or in the above description of the preferred embodiment of the invention, the terms “comprising,” “including,” and “having” are intended to be open-ended and mean that there may be additional elements other than the listed elements. Additionally, the term “portion” should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed.

What is claimed is:

1. A gas blaster assembly comprising:

a storage container having a volume of compressed gas;

a gas channeling device, the gas channeling device comprising a stationary portion and a movable portion, the stationary portion comprising a fluid inlet passageway and at least first and second fluid outlet passageways, the movable portion comprising a fluid channeling passageway, the movable portion being pivotally movable about a pivot axis relative to the stationary portion in a manner such that the movable portion can be selectively positioned in alternative first and second positions relative to the stationary portion, the fluid channeling passageway operatively connecting the fluid inlet passageway to the first fluid outlet passageway when the movable portion is in the first position, the second fluid outlet passageway being operatively disconnected from the fluid inlet passageway when the movable portion is in the first position, the fluid channeling passageway operatively connecting the fluid inlet passageway to the second fluid outlet passageway when the movable portion is in the second position, the first fluid outlet passageway being operatively disconnected from the fluid inlet passageway when the movable portion is in the second position;

a release valve, the release valve operatively connecting the volume of compressed gas to the fluid inlet passageway of the gas channeling device.

2. A gas blaster assembly in accordance with claim 1 wherein the fluid channeling passageway comprises an inlet terminal end and at least one outlet terminal end, the fluid inlet passageway comprises a outlet terminal end, the first and second fluid outlet passageways each comprise an inlet terminal end, the inlet terminal end of the fluid channeling passageway and the outlet terminal end of the fluid inlet passageway are centered about the pivot axis, and the outlet terminal end of the fluid channeling passageway and the inlet terminal ends of the first and second fluid outlet passageways are radially and equidistantly spaced from the pivot axis.

3. A gas blaster assembly in accordance with claim 2 wherein the gas blaster assembly further comprises an o-ring seal, and wherein the o-ring seal has a passageway extending therethrough and the inlet terminal end of the fluid channeling passageway and the outlet terminal end of the inlet fluid passageway operatively join each other through the passageway of the o-ring seal when the moveable portion of the gas channeling device is in the first position and when the movable portion is in the second position.

4. A gas blaster assembly in accordance with claim 2 wherein the gas blaster assembly further comprises an o-ring seal, the o-ring seal is aligned with and positioned between the outlet terminal end of the fluid channeling passageway and the inlet terminal end of the first fluid outlet passageway when the movable portion of the gas channeling device is in the first position, and the o-ring seal is aligned with and positioned between the outlet terminal end of the fluid channeling passageway and the inlet terminal end of the second fluid outlet passageway when the movable portion of the gas channeling device is in the second position.

5. A gas blaster assembly in accordance with claim 2 wherein the gas blaster assembly further comprises an o-ring seal, the o-ring seal is compressed between the movable portion of the gas channeling device and the inlet terminal end of the second fluid outlet passageway in a manner sealing off the inlet terminal end of the second fluid outlet passageway when the movable portion of the gas channeling device is in the first position, and the o-ring seal is attached to the movable portion in a manner such that pivotally moves about the pivot axis with the movable portion.

6. A gas blaster assembly in accordance with claim 1 further comprising an electric motor that is configured and adapted to pivotally drive the movable portion of the gas channeling device about the pivot axis relative to the stationary portion.

7. A gas blaster assembly in accordance with claim 6 wherein the electric motor comprises a stator and a rotor, and wherein the stator is fixed to the stationary portion of the gas channeling device and the rotor is rotatable relative thereto.

8. A method of utilizing a gas channeling device, the gas channeling device comprising a stationary portion and a movable portion, the stationary portion comprising a fluid inlet passageway and a plurality of fluid outlet passageways, the movable portion comprising a fluid channeling passageway, the movable portion being pivotally movable about a pivot axis relative to the stationary portion in a manner such that the movable portion can be selectively positioned in alternative first and second positions relative to the stationary portion, the method comprising:

activating a release valve in a manner discharging compressed gas from a storage container and forcing a blast of gas through the fluid inlet passageway, the fluid channeling passageway, and a first one of the fluid outlet passageways of the gas channeling device while the movable portion of the gas channeling device is in the first position;

causing the movable portion of the gas channeling device to pivot about the pivot axis relative to the stationary portion from the first position and into the second position; and activating the release valve in a manner discharging compressed gas from the storage container and forcing a blast of gas through the fluid inlet passageway, the fluid channeling passageway, and a second one of the fluid outlet passageways of the gas channeling device while the movable portion of the gas channeling device is in the second position.

9. A method in accordance with claim 8 wherein the step of causing the movable portion of the gas channeling device to pivot about the pivot axis relative to the stationary portion from the first position and into the second position occurs via an electric motor.

10. A method in accordance with claim 8 wherein the movable portion is pivotally movable about a pivot axis relative to the stationary portion in a manner such that the movable portion can be selectively positioned in alternative third, fourth, fifth, and sixth positions relative to the stationary portion, and wherein the method further comprises:

causing the movable portion of the gas channeling device to pivot about the pivot axis relative to the stationary portion from one of the first, second, fourth, fifth, and sixth positions and into the third position;

activating the release valve in a manner discharging compressed gas from the storage container and forcing a blast of gas through the fluid inlet passageway, the fluid channeling passageway, and a third one of the fluid outlet passageways of the gas channeling device while the movable portion of the gas channeling device is in the third position;

causing the movable portion of the gas channeling device to pivot about the pivot axis relative to the stationary portion from one of the first, second, third, fifth, and sixth positions and into the fourth position;

activating the release valve in a manner discharging compressed gas from the storage container and forcing a blast of gas through the fluid inlet passageway, the fluid channeling passageway, and a fourth one of the fluid outlet passageways of the gas channeling device while the movable portion of the gas channeling device is in the fourth position;

causing the movable portion of the gas channeling device to pivot about the pivot axis relative to the stationary portion from one of the first, second, third, fourth, and sixth positions and into the fifth position;

activating the release valve in a manner discharging compressed gas from the storage container and forcing a blast of gas through the fluid inlet passageway, the fluid channeling passageway, and a fifth one of the fluid outlet passageways of the gas channeling device while the movable portion of the gas channeling device is in the fifth position;

causing the movable portion of the gas channeling device to pivot about the pivot axis relative to the stationary portion from one of the first, second, third, fourth, and fifth positions and into the sixth position;

activating the release valve in a manner discharging compressed gas from the storage container and forcing a blast of gas through the fluid inlet passageway, the fluid channeling passageway, and a sixth one of the fluid outlet passageways of the gas channeling device while the movable portion of the gas channeling device is in the sixth position.

11. A method in accordance with claim 8 further comprising:

utilizing the gas channeling device to seal off the second one of the fluid outlet passageways of the gas channeling device during the step of activating the release valve in a manner discharging compressed gas while the movable portion of the gas channeling device is in the first position; and utilizing the gas channeling device to seal off the first one of the fluid outlet passageways of the gas channeling device during the step of activating the release valve in a manner discharging compressed gas while the movable portion of the gas channeling device is in the second position.

12. A method in accordance with claim 8 wherein the first one of the plurality of fluid outlet passageways is operatively connected to a first bulk material handling device and wherein the step of activating a release valve in a manner discharging compressed gas while the movable portion of the gas channeling device is in the first position causes a blast of gas to move bulk material within the first bulk material handling device.

13. A method in accordance with claim 12 wherein the second one of the plurality of fluid outlet passageways is operatively connected to a second bulk material handling device and wherein the step of activating a release valve in a manner discharging compressed gas while the movable portion of the gas channeling device is in the second position causes a blast of gas to move bulk material within the second bulk material handling device.

* * * * *